United States Patent [19]

Johnson

[11] Patent Number: 4,568,596
[45] Date of Patent: Feb. 4, 1986

[54] NONWOVEN FABRIC

[75] Inventor: Eric D. Johnson, Wilmington, Del.

[73] Assignee: Hercules Incorporated, Wilmington, Del.

[21] Appl. No.: 632,096

[22] Filed: Jul. 18, 1984

[51] Int. Cl.$^4$ .................... A61F 13/16; A61L 15/00; B29C 17/02; B29D 7/24

[52] U.S. Cl. .................... 428/134; 204/168; 264/147; 264/154; 264/284; 264/290.2; 264/DIG. 47; 264/DIG. 81; 428/156; 428/167; 522/71; 522/112

[58] Field of Search .................... 264/154, 290.2, 284, 264/147, DIG. 47, DIG. 81; 428/134, 156, 167; 204/159.17, 168

[56] References Cited

U.S. PATENT DOCUMENTS

| | | | |
|---|---|---|---|
| 3,137,746 | 6/1964 | Seymour et al. | 264/73 |
| 3,387,077 | 6/1968 | Sammons et al. | 264/289 |
| 3,434,472 | 3/1969 | Herniman et al. | |
| 3,484,835 | 12/1969 | Trounstine et al. | |
| 3,616,154 | 10/1971 | Dow et al. | |
| 3,632,716 | 11/1972 | Fairbanks | 264/DIG. 47 |
| 3,832,267 | 8/1974 | Liu | |
| 3,851,034 | 11/1974 | Harmon et al. | 264/DIG. 47 |
| 3,911,187 | 10/1975 | Raley | 428/180 |
| 3,950,475 | 4/1976 | Dow et al. | 264/DIG. 47 |
| 3,954,933 | 5/1976 | Rasmussen | 264/DIG. 47 |
| 3,985,600 | 10/1976 | Blais | 264/154 |
| 4,077,410 | 3/1978 | Butterworth | |
| 4,133,310 | 1/1979 | Lloyd et al. | |
| 4,135,021 | 1/1979 | Patchell et al. | 428/134 |
| 4,272,473 | 6/1981 | Riemersma et al. | 264/154 |
| 4,280,928 | 7/1981 | Dannheim et al. | 264/154 |
| 4,317,792 | 3/1982 | Raley et al. | 264/154 |
| 4,327,730 | 5/1982 | Sorensen | |
| 4,376,147 | 3/1983 | Byrne et al. | 428/167 |
| 4,377,544 | 3/1983 | Rasmussen | 264/154 |
| 4,455,337 | 6/1984 | Lloyd et al. | 264/DIG. 81 |

Primary Examiner—James C. Cannon
Attorney, Agent, or Firm—M. C. Staves

[57] ABSTRACT

A nonwoven texturized fabric is produced by embossing a molten film of a polymer blend of high density polyethylene and polystyrene with hexagonal shaped bosses, biaxially stretching the thus embossed film to produce an openwork net and then texturizing the net with special texturizing rollers to flatten and deform some of the bosses and bend some of the bands at an angle to the plane of the fabric to produce an essentially irregular pattern of bosses connected by bands.

31 Claims, 7 Drawing Figures

NONWOVEN FABRIC

FIELD OF THE INVENTION

This invention relates to a process of preparing nonwoven fabrics and to the fabrics so prepared. More particularly, this invention relates to a process of embossing an extruded film of a blend of high-density polyethylene and polystyrene, on one side with a pattern of raised hexagonal bosses and providing on one or both sides if desired with a micro-matte finish (i.e., a microscopic surface roughness essentially devoid of scratches), sequentially biaxially stretching the thus embossed film to produce an openwork net-like fabric with a uniform regular pattern of bosses, openings and connecting bands and then passing the net-like fabric through special texturizing rollers to flatten and deform, at random, some of the bosses and bend some of the bands at an angle to the plane of the fabric. The resulting fabric has an essentially irregular pattern of bosses, openings and connecting bands, a cloth-like appearance, a soft hand, and a marked reduction in gloss.

BACKGROUND OF THE INVENTION

It is well known to prepare net-like fabrics by embossing thermoplastic film and then sequentially biaxially stretching. For example, U.S. Pat. No. 3,137,746 to Seymour et al teaches a process for producing openwork net fabrics by embossing thermoplastic film with raised hexagonal bosses and then sequentially biaxially stretching. The nets produced by the method of Seymour et al have regular uniform patterns, no micro-matte finish on one side, are not texturized and contain no blends of polymers. Consequently, the Seymour et al nets have a glossy plastic look and a harsh feel.

It is also known to prepare non-woven fabrics using a blend of polyethylene and polystyrene, such as taught in U.S Pat. No. 4,133,310 to Lloyd et al. However, Lloyd et al specify that the film of polymer blend be embossed with raised bosses on one side and parallel grooves on the other and that the thus embossed film be stretched exclusively or predominantly in the direction of the grooves. The resulting non-woven comprises regular uniform patterns of rows of interconnected bosses connected with dense masses of fibers, some of which may be as fine as 0.1 micron. The Lloyd et al non-wovens have no micro-matte finish on one side are not texturized and are thus glossy and harsh with a paper-like stiffness.

BRIEF DESCRIPTION OF THE INVENTION

It has now surprisingly been found that by following certain critical parameters, polymeric nonwoven fabrics can be prepared that have a soft cloth-like feel and appearance and a marked reduction in gloss. Accordingly, this invention relates to a process for preparing nonwoven fabric comprising the steps of (a) extruding a molten polymer blend comprising
  (1) from about 85 to about 97%, most preferably from about 90 to about 95%, by weight of high density polyethylene having a melt index of from about 14 to about 24 grams per 10 minutes, when measured at 190° C., and
  (2) from about 3 to about 15%, most preferably from about 5 to about 10%, by weight of polystyrene;

(b) providing the thus extruded molten film of polymer blend, on one surface, with from about 1500 to about 4500, most preferably from about 2500 to about 3500, small solid raised bosses of hexagonal shape per square inch, by passing the said molten extruded film into the nip formed by an embossing roller with engraved hexagonal cavities and an opposing casting roller at a pressure of from about 5 to about 40 pounds per linear inch, said hexagonal cavities being arranged with space between adjacent hexagons, in parallel rows in the machine direction of the film and with two parallel flat edges of each of the hexagons in the cross machine direction of the film.

(c) then sequentially biaxially drawing the film
  (1) first in the machine direction from about 2 to about 30%, most preferably from about 5 to about 15%,
  (2) then in the cross machine direction from about 200 to about 260%, most preferably from about 220 to about 240%, and
  (3) finally in the machine direction from about 150 to about 250%, most preferably from about 180 to about 210%, and (d) finally texturizing the resulting openwork net by heating it at a temperature below the melting temperature of the polymer blend, i.e., from about 180° to about 240° F., and passing the net into the nip formed by a heated texturizing roller and a cooled resilient roller, at a pressure of from about 60 to about 120 pounds per linear inch, said texturizing roller having from about 20 to about 3000, most preferably from about 50 to about 1000, cylindrical pins per square inch protruding from its surface, said pins being arranged in a pattern that approximates a random pin placement, each pin being from about 10 to about 30 mils long and having a diameter of from about 15 to about 60 mils, most preferably from about 25 to about 40 mils.

In a further modification of this invention, one or both surfaces of the fabric can be imparted with a micro-matte finish by using embossing and/or casting rollers with micro-matte finishes.

The nonwoven texturized fabric resulting from the above process comprises a plurality of essentially parallel rows of bosses running in the machine direction of the fabric, each boss and parts of the bands having a micro-matte finish (where such finish was imparted) and each boss being connected to adjacent bosses by six partially fibrillated molecularly oriented bands with cobweb-like fibril structures in at least some of the corners between the bands, said bosses in adjacent rows being staggered in the cross machine direction of the fabric, each of said corners formed by adjacent bands being an angle greater than 45°, most preferably at least 50°, at least some of said bosses being flattened and deformed (due to texturizing) and at least some of said bands being bent at angles to the plane of the fabric, resulting in an essentially irregular pattern. The nonwoven texturized fabric of this invention has a cloth-like appearance, a soft hand and very little gloss.

DETAILED DESCRIPTION OF THE DRAWINGS

Figure 1:
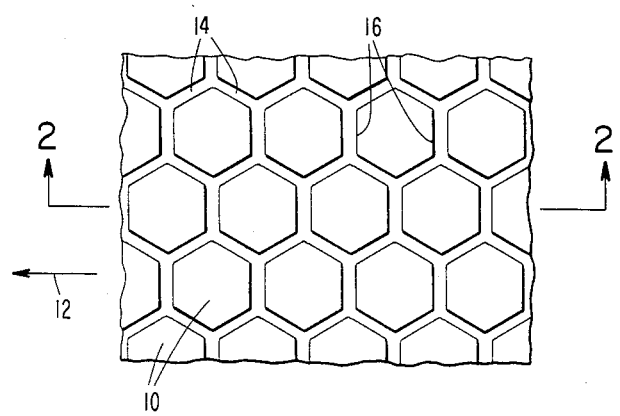
FIG. 1 is an enlarged plan view of a portion of the embossed film of polymer blend.

FIG. 1 is an enlarged plane view of a portion of the embossed film of polymer blend prepared in accordance with the process of this invention. Each raised boss 10 is a regular hexagon. The raised bosses 10 are arranged in parallel rows in the machine direction, depicted by arrow 12. The bosses 10 are staggered in the cross machine direction so that spaces 14 between the bosses 10 are of the same width. Bosses 10 in the rows are arranged so that two parallel flat edges 16 of each boss 10 run in the cross machine direction.

Figure 2:
FIG. 2 is a section taken along line 2—2 of FIG. 1, and enlarged with respect to the thickness to a greater scale than the enlargement of FIG. 1.

FIG. 2 is a section taken along line 2—2 of FIG. 1 and enlarged with respect to the thickness to a greater scale than the enlargement of FIG. 1. The ratio of the thickness of the raised bosses 10 to the narrow spaces 14 is approximately 3:1 and the width of the raised bosses 10 to the width of the narrow spaces 14 is approximately 5:1.

Figure 3:
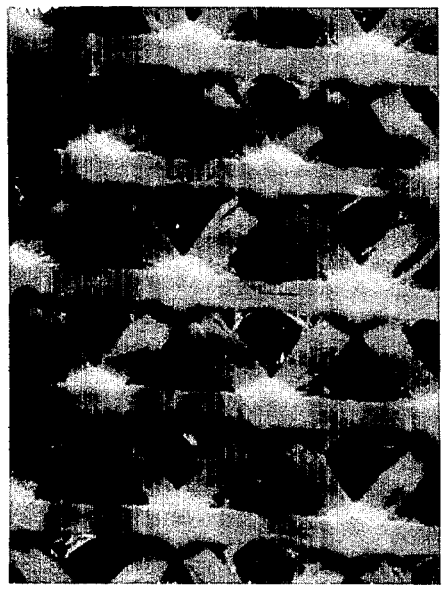
FIG. 3 is a microphotograph of a top plan view of the openwork net used in the texturizing process of this invention.

FIG. 3 is a microphotograph with a magnification of 25× showing a top plan view of the openwork net used in the texturizing process of this invention. The machine direction is across the figure and the cross machine direction is up and down. The rows of raised hexagonal bosses are facing upward and can be seen to run in parallel rows in the machine direction but to be staggered in the cross machine direction. Each boss is connected to adjacent bosses by six partially fibrillated molecularly oriented bands The said bands form isosceles triangular openings with cobweb-like fibril structures in many of the corners. The angles formed by the bands are approximately 50° and 80°.

Figure 4:
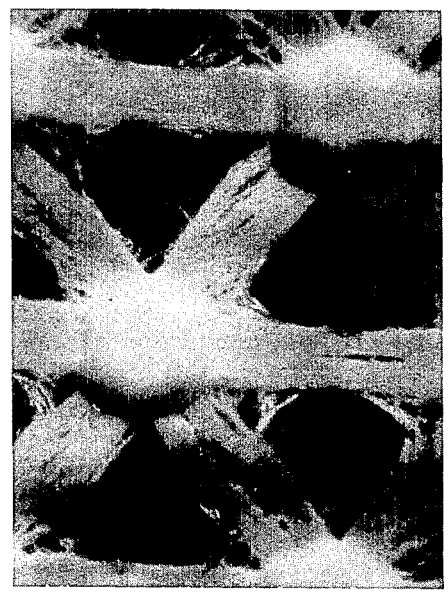
FIG. 4 is an enlargement of a section of the microphotograph of FIG. 3.

FIG. 4 is an enlargement of a section of the microphotograph of FIG. 3 with a magnification of 50×. A section of the first boss and the complete second boss in the second row of bosses, the second boss in the third row and the top of the second boss in the forth row, along with the connecting bands from FIG. 3 are shown in enlargement.

Figure 5:
FIG. 5 is a microphotograph of a cross-sectional view of the openwork net used in the texturizing process of this invention.

FIG. 5 is a microphotograph with a magnification of 50× showing a cross-sectional view of the openwork net used in the texturizing process of this invention. Two raised bosses can clearly be seen as truncated pyramids connected by bands.

Figure 6:
FIG. 6 is a microphotograph of a top plan view of the nonwoven texturized fabric of this invention.

FIG. 6 is a microphotograph with a magnification of 25× showing a top plan view of the nonwoven texturized fabric of this invention. The machine direction is across the figure and the cross machine direction is up and down. It can be seen by comparing FIG. 6 with FIG. 3 that texturizing deforms and flattens some of the bosses and bends some of the connecting bands at an angle to the plane of the fabric, so that the regularity of the pattern (seen in FIG. 3) is changed to an essentially irregular pattern.

Figure 7:
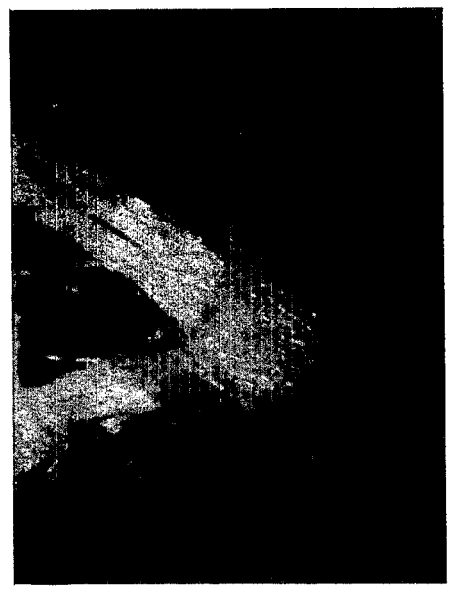
FIG. 7 is a microphotograph of a bottom plan view of the nonwoven texturized fabric of this invention.

FIG. 7 is a microphotograph with a magnification of 50× showing a bottom plan view of the nonwoven texturized fabric of this invention. The micro-matte finish imparted to the fabric when it was originally embossed can still be seen on the bottom of the bosses and parts of the bands.

DETAILED DESCRIPTION OF THE INVENTION

As indicated above, certain specific parameters must be followed in order to obtain the novel nonwoven texturized fabrics of this invention. The first specific parameter is the polymer blend used in making the fabric. Only specific blends of specific polymers can be used if one wants to obtain the specific configuration of bosses and connecting bands of the fabric of this invention. The primary polymeric ingredient in the blend is high density polyethylene having a melt index of from about 14 to about 24 grams per 10 minutes, when measured at 190° C. Preferably, the polyethylene will have a narrow molecular weight distribution. The polyethylene will constitute from about 85 to about 97%, most preferably from about 90 to about 95%, by weight, of the blend. The secondary, but necessary, polymeric ingredient in the blend is polystyrene, most preferably high impact polystyrene. It will constitute from about 3 to about 15%, most preferably from about 5 to about 10%, by weight of the blend.

Excellent nonwoven texturized fabrics can be made by using a blend of only high density polyethylene and polystyrene in the process of this invention. However, it may be desirable in certain cases to add other ingredients to the polymer blend. It will be obvious to those skilled in the art that it may be desirable to add small amounts of anti-oxidants, stabilizers, processing lubricants, anti-static agents, and other additives normally used in extruding and drawing polymers. It may also be desirable to add pigments to impart color to the fabric. Typical pigments which may be used are titanium dioxide, cadmium yellow, cadmium red, manganese blue, cobalt blue, burnt sienna, burnt umber and the like. Often the pigment will be added as a concentrate finely ground and mixed with a polymer such as low density polyethylene. Generally from about 5 to about 10% by weight of the pigment will be added based on the weight of the blend. If the pigment is added as a 50:50 concentrate in a polymer, then from about 10 to about 20% by weight of the concentrate will be added. The addition of a white concentrate comprising a 50:50 mixture, by weight, of titanium dioxide and low density polyethylene is most preferred. It may also be desirable in certain cases to add from about 3 to about 20%, by weight, of other polymers such as low density polyethylene, including linear low density polyethylene, ethylene copolymers, such as ethylene vinylacetate, ethylene methylacrylate and the like, styrene copolymers, synthetic rubbers, polyesters, polyamides, polyurethanes and the like. The addition of any additive to the polymer blend, used in this invention, will be made as a substitute for an equal amount, by weight, of the high density polyethylene. For example, if one adds 5% by weight of pigment-polymer concentrate to the blend, they will use 15% less of the high density polyethylene than they would have used otherwise. Thus, the 85 to 97%, by weight, of high density polyethylene recited above as the primary ingredient in the blend will be reduced to 70 to 82%, by weight, if 15% of pigment-polymer concentrate is added.

The polymers and any desired additives can be blended in any conventional manner as will be obvious to those skilled in the art. The polymer blend will be extruded through a conventional slit die. Any slit die which will give a polymer film of from about 6 to about 100 inches in width and from about 1 to about 15 mils in thickness can be used.

It may be desirable in certain cases to co-extrude the polymer blend with certain combinations of additives such as colored pigments and other polymers; thus producing a film of the polymer blend with a thin coating of the additive combination on one or both sides. For example, it may be desirable to co-extrude the polymer blend with a mixture of ethylene vinylacetate and colored pigment on one or both sides. Specialized apparatus for conducting such co-extrusions are well-known in the art, such as, for example, combining adaptors and multi-manifold vaned dies manufactured by P.C.E. Incorporated.

The second specific set of parameters which must be followed in the process of this invention involves the embossing of one side of the film while, if desired, imparting a micro-matte finish to one or both sides. The extruded film, while still molten, is passed into the nip formed by two opposing rollers. The rollers are maintained at a temperature of from about 40° to about 180° F. and exert from about 5 to about 40 pounds per linear inch on the film. The rollers will generally have metal surfaces, preferably steel. The surface of the opposing casting roller will be smooth or, if desired, have a microscopic surface roughness essentially devoid of scratches formed by a conventional process such as sand blasting, adhering particles to the surface of the roller or by mechanically engraving the roller. The other roller has a surface engraved with from about 1500 to about 4500, most preferably from about 2500 to about 3500 hexagonal shaped cavities per square inch and may also, if desired, have a micro-matte finish. The cavities are arranged in parallel rows in the machine direction (i.e., around the roller) and staggered in the cross machine direction (i.e., across the roller) with spaces (i.e., land areas) between each hexagonal cavity. The hexagonal cavities are arranged so that two parallel flat edges on each cavity run in the cross machine direction. The depth of the cavities is sufficient to yield an embossed film having a thickness at the bosses of from about 2 to about 10 mils. In general, the ratio of the thickness of the bosses to the thickness of the narrow spaces is approximately 3:1. As indicated above, it may be desirable to impart a micro-matte finish to both sides of the film, only one side or neither side. For example, if one does not require a marked reduction in gloss the imparting of a micro-matte finish can be eliminated, in which case neither roller will have a microscopic surface roughness. All modifications, i.e., with and without the micro-matte finish, are a part of this invention. However, it is most preferable to have a micro-matte finish on at least one side of the film.

The third specific set of parameters which must be followed in the process of this invention involves the sequential biaxial stretching of the embossed film. The film is heated to a temperature above ambient temperature but below the melting point of the polymer blend by conventional means, such as passing the film over heated rollers. It is first stretched from about 2 to about 30%, most preferably from about 5 to about 15%, in the machine direction. It is next stretched from about 200 to about 260%, most preferably from about 220 to about 240% in the cross machine direction and finally from about 150 to about 250%, most preferably from about 180 to about 210% in the machine direction. The stretching will be conducted on conventional machinery used for such stretching. In general, stretching in the cross machine direction will be conducted on a commercial tenter, while stretching in the machine direction will be conducted using rollers of varying speeds.

The openwork net resulting from the stretching will have from about 500 to about 1500 raised bosses in the shape of truncated hexagonal pyramids per square inch. Each boss will retain the micro-matte finish on the side the finish was imparted (if it was originally imparted with such a finish) and be connected to adjacent bosses by six partially fibrillated molecularly oriented bands, which bands may retain at least part of the micro-matte finish. The said bands form isosceles triangular openings with cobweb-like fibril structures in at least some, most preferably most, of the corners. The angles formed by the bands at the corners of the triangular openings will all be greater than 45°, most preferably at least 50°. The openwork net structures will have a thickness at the bosses of from about 2 to about 10 mils and from about 0.5 to about 3 mils at the connecting bands. The weight of the net will be from about 0.2 to about 2 ounces per square yard. The net will have an air permeability of from about 50 to about 1000 cubic feet per minute per square foot measured at 0.5 inch of water pressure drop across a 1 square inch area on a Frazier air permeability testing machine.

The final specific set of parameters which must be followed to produce the nonwoven fabric of this invention involves texturizing the openwork net. The net is heated to a temperature below the melting point of the polymer blend, most preferably from about 180° to about 240° F., and passed into the nip formed by a heated texturizing roller and a cooled resilient roller which together exert from about 60 to about 120 pounds per linear inch. The texturizing roller will have from about 20 to about 3000, most preferably from about 50 to about 1000 cylindrical shaped pins per square inch protruding from its surface. The pins will be arranged in a pattern that approximates a random pin placement. Each pin will be from about 10 to about 30 mils long. All of the pins may be the same diameter or it may be desirable to have pins of various diameters. In general, however, the round flat ends of the pins will have a diameter of from about 15 to about 60 mils, most preferably from about 25 to about 40 mils. The texturizing roller can be made of any metal, most preferably steel. The cooled resilient roller will have a resilient surface such as rubber or synthetic rubber. It may be a metal roller with a resilient surface or the whole roller can be made of the resilient material. It will be obvious to those skilled in the art that the openwork net may be texturized on either or both sides. Most preferably, it will be texturized by pressing the texturizing pins against the side of the net imparted with the micro-matte finish.

The resulting nonwoven texturized fabric will be similar to the openwork net from which it is formed to the extent that it will have a plurality of essentially parallel rows of bosses running in the machine direction of the fabric, each boss and parts of the bands having a micro-matte finish on one or both sides (if it was originally imparted with such a finish) and each boss being connected to adjacent bosses by six partially fibrillated molecularly oriented bands with cobweb-like fibril structures in at least some of the corners, most preferably in most of the corners, between the bands. The corners formed by adjacent bands will be an angle greater than 45°, most preferably at least 50° and the bosses in adjacent rows will be staggered. However, at least some of the bosses, preferably many of the bosses, of the texturized fabric will be flattened and deformed due to the texturizing process and at least some of the bands, preferably many of the bands, will be bent at angles to the plane of the fabric, resulting in an essentially irregular pattern of bosses and connecting bands. The non-woven texturized fabric of this invention has a cloth-like appearance, a soft hand and drape and very little gloss. The nonwoven texturized fabric of this invention is most useful as cover stock for sanitary napkins, diapers, incontinence pads, surgical dressings and the like.

It may be desirable in certain cases to change the surface properties of the fabric, i.e., such as wettability. This may be done by treating the fabric after texturizing or the openwork net before texturizing with a well-known surface treatment such as corona discharge, plasma discharge, flame, and the like.

The following example will serve to further illustrate the invention.

EXAMPLE

A blend of 8 parts by weight of high impact polystyrene, having a melt index of 7.5 grams per 10 minutes measured at 90° C.; 16 parts by weight of commercial fiber grade white concentrate, comprising equal parts by weight of finely powdered titanium dioxide and low density polyethylene; and 76 parts by weight of high density polyethylene, having a melt index of 17 grams per 10 minutes measured at 190° C., is melted and extruded through a 37 inch slit die to give a molten polymer film approximately 5 mils thick.

The molten film is then fed into the nip formed by two rollers exerting a pressure of approximately 20 pounds per linear inch. One of the rollers has a steel surface engraved with 2900 hexagonal cavities per square inch, said cavities being arranged with lands between adjacent hexagonal cavities, in parallel rows in the machine direction of the film and with two parallel flat edges of each hexagon in the cross machine direction of the film. The ratio of land width to hexagon width is approximately 1:6. The other roller is also made of steel and has a microscopic surface roughness essentially devoid of scratches, formed by sand blasting the surface of the roller. Both rollers are temperature controlled with circulating water.

The film embossed on one side with hexagonal bosses and having a micro-matte finish on the other side is then stretched at a temperature below the melting point of the blend but above ambient temperature, first 10% in the machine direction, followed by 230% in the cross machine direction in a commercial tenter, and finally 190% in the machine direction. The resulting openwork net has a thickness of approximately 5 mils at the raised bosses and approximately 1 mil at the connecting bands. There are approximately 850 bosses in the shape of truncated hexagonal pyramids per square inch connected by six partially fibrillated molecularly oriented bands per boss, with cobweb-like fibril structures in many of the corners betweeen bands. The connecting bands form isosceles triangular openings. The two equal angles in the corners are approximately 51° with the larger angle being 78°. One side of the net, i.e., the back, retains most of the micro-matte finish. The weight of the net is 0.64 ounces per square yard and has an air permeability of approximately 350 cubic feet per minute per square foot, measured at 0.5 inch of water pressure drop across a 1 square inch area on a Frazier air permeability testing machine.

The above net is heated to a temperature of approximately 230° F. by passing over heated rollers and feed into the nip formed by a heated texturizing roller and a cooled roller covered with a resilient rubber coating. The two rollers exert a pressure of 100 pounds per linear inch. The texturizing roller is made of steel and has approximately 150 cylindrical pins per square inch protruding from its surface. Each pin is approximately 20 mils long and has a diameter of approximately 35 mils at the face. The pins are arranged in a pattern that approximates a random pin placement.

The nonwoven texturized fabric product has an effective thickness of approximately 7.5 mils caused by the deformation of the net structure at angles to the plane of the fabric. The raised bosses with their connecting bands, the angles they form and the cobweb-like fibril structures are retained. However, many bosses have been flattened and deformed and many bands have been bent at an angle to the plane of the fabric. The micro-matte finish is still retained on the bottom side of the bosses and parts of the bands. The weight of the fabric is increased approximately 10% over that of the untexturized openwork net because of shrinkage and the air permeability is increased approximately 12%. The fabric product has a cloth-like appearance, a marked reduction in gloss, and a soft hand and drape caused by a combination of the micro-matte finish, the texturizing and the specific polymers blend used.

The nonwoven texturized fabric product is used as a cover stock in sanitary napkins with excellent results.

Another sample of the above nonwoven texturized fabric is treated by running it at 100 feet per minute around a bare aluminum roller provided with 4 ceramic electrode corona discharge units. Each unit is provided with 2000 watts of power. The sample has a surface tension of 34 dynes per centimeter before treatment and 60 dynes per centimeter after treatment. The resulting product is also useful as a cover stock in sanitary napkins.

What I claim and desire to protect by Letters Patent is:

1. A process for the preparation of nonwoven texturized fabric comprising the steps of
    (a) extruding a molten polymer blend comprising
        (i) from about 85 to about 97% by weight of high density polyethylene having a melt index of from about 14 to about 24 grams per 10 minutes, when measured at 190° C., and
        (ii) from about 3 to about 15% by weight of polystyrene;
    (b) providing the thus extruded molten film, on one surface, with from about 1500 to about 4500 small solid raised bosses of hexagonal shape per square inch by passing the said molten extruded film into the nip formed by an embossing roller with engraved hexagonal cavities and an opposing casting roller at a pressure of from about 5 to about 40 pounds per linear inch;
    (c) then sequentially biaxially drawing the film
        (i) first in the machine direction from about 2 to about 30%, (ii) then in the cross machine direction from about 200 to about 260%, and (iii) finally in the machine direction from about 150 to about 250%; and (d) finally texturizing the resulting openwork net by heating it at a temperature of from about 180° to about 240° F., and passing the net into the nip formed by a heated texturizing roller and a cooled resilient roller, at a pressure of from about 60 to about 120 pounds per linear inch, said texturizing roller having from about 20 to about 3000 cylindrical pins per square inch protruding from its surface, said pins being arranged in a pattern that approximates a random pin placement, each pin being from about 10 to about 30 mils long and having a diameter of from about 15 to about 60 mils.

2. The process of claim 1 wherein from about 5 to about 10% by weight of the high density polyethylene has been substituted for by an equal amount by weight of at least one finely powdered colored pigment.

3. The process of claim 1 wherein from about 10 to about 20% by weight of the high density polyethylene has been substituted for by an equal amount by weight of a 50:50 mixture of finely powdered titanium dioxide and low density polyethylene.

4. The process of claim 1 wherein the extruded molten film is provided with a micro-matte finish on the side opposite the raised bosses by using an opposing casting roller with a micro-matte finish.

5. The process of claim 1 wherein the extruded molten film is provided with a micro-matte finish on the same side as the raised bosses by using an embossing roller with a micro-matte finish.

6. The process of claim 1 wherein the extruded molten film is provided with a micro-matte finish on both sides by using an embossing roller and an opposing casting roller each having a micro-matte finish.

7. The process of claim 2 wherein the extruded molten film is provided with a micro-matte finish on the side opposite the raised bosses by using an opposing casting roller with a micro-matte finish.

8. The process of claim 2 wherein the extruded molten film is provided with a micro-matte finish on the same side as the raised bosses by using an embossing roller with a micro-matte finish.

9. The process of claim 2 wherein the extruded molten film is provided with a micro-matte finish on both sides by using an embossing roller and an opposing casting roller each having a micro-matte finish.

10. The process of claim 1 wherein the polymer blend is co-extruded with a mixture of at least one other polymer and at least one finely powdered colored pigment.

11. The process of claim 10 wherein the co-extruded molten film is provided with a micro-matte finish on the side opposite the raised bosses by using an opposing casting roller with a micro-matte finish.

12. The process of claim 11 wherein the surface properties of the fabric are modified by a treatment selected from corona discharge, plasma discharge, and flame treatment.

13. The process of claim 2 wherein the polymer blend is co-extruded with a mixture of at least one other polymer and at least one finely powdered colored pigment.

14. The process of claim 13 wherein the co-extruded molten film is provided with a micro-matte finish on the side opposite the raised bosses by using an opposing casting roller with a micro-matte finish.

15. The process of claim 14 wherein the surface properties of the fabric are modified by a treatment selected from corona discharge, plasma discharge, and flame treatment.

16. The process of claim 7 wherein the surface properties of the fabric are modified by a treatment selected from corona discharge, plasma discharge, and flame treatment.

17. A nonwoven texturized fabric prepared by the process comprising the steps of (a) extruding a molten polymer blend comprising (i) from about 85 to about 97% by weight of high density polyethylene having a melt index of from about 14 to about 24 grams per 10 minutes, when measured at 190° C., and (ii) from about 3 to about 15% by weight of high impact polystyrene;

(b) providing the thus extruded molten film, on one surface, with from about 1500 to about 4500 small solid raised bosses of hexagonal shape per square inch by passing the said molten extruded film into the nip formed by an embossing roller with engraved hexagonal cavities and an opposing casting roller at a pressure of from about 5 to about 40 pounds per linear inch;

(c) then sequentially biaxially drawing the film (i) first in the machine direction from about 2 to about 30%, (ii) then in the cross machine direction from about 200 to about 260%, and (iii) finally in the machine direction from about 150 to about 250%; and (d) finally texturizing the resulting openwork net by heating it at a temperature of from about 180° to about 240° F., and passing the net into the nip formed by a heated texturizing roller and a cooled resilient roller, at a pressure of from about 60 to about 120 pounds per linear inch, said texturizing roller having from about 20 to about 3000 cylindrical pins per square inch protruding from its surface, said pins being arranged in a pattern that approximates a random pin placement, each pin being from about 10 to about 30 mils long and having a diameter of from about 15 to about 60 mils.

18. The nonwoven texturized fabric of claim 17 wherein from about 5 to about 10% by weight of the high density polyethylene has been substituted for by an equal amount by weight of at least one finely powdered colored pigment.

19. The product of claim 17 wherein the extruded molten film is provided with a micro-matte finish on the side opposite the raised bosses by using an opposing casting roller with a micro-matte finish.

20. The product of claim 18 wherein the extruded molten film is provided with a micro-matte finish on the side opposite the raised bosses by using an opposing casting roller with a micro-matte finish.

21. The product of claim 18 wherein the polymer blend is co-extruded with a mixture of at least one other polymer and at least one finely powdered colored pigment.

22. The product of claim 21 wherein the co-extruded molten film is provided with a micro-matte finish on the side opposite the raised bosses by using an opposing casting roller with a micro-matte finish.

23. The product of claim 22 wherein the surface properties of the fabric are modified by a treatment selected from corona discharge, plasma discharge and flame treatment.

24. The product of claim 20 wherein the surface properties of the fabric are modified by a treatment selected from corona discharge, plasma discharge and flame treatment.

25. A nonwoven texturized fabric made of a polymer blend comprising from about 85 to about 97% by weight of high density polyethylene having a melt index of from about 14 to about 24 grams per 10 minutes when measured at 190° C. and from about 3 to about 15% by weight of polystyrene and comprising a plurality of essentially parallel rows of raised bosses running in the machine direction of the fabric, each boss being connected to adjacent bosses by six partially fibrillated molecularly oriented bands with cobweb-like fibril structures in at least some of the corners between the bands, said bosses in adjacent rows being staggered in the cross machine direction of the fabric, each of said corners formed by adjacent bands being an angle greater than 45°, at least some of said bosses being flattened and deformed and at least some of said bands being bent at angles to the plane of the fabric so that the bosses and bands form an essentially irregular pattern.

26. The product of claim 25 wherein from about 5 to about 10% by weight of the high density polyethylene has been substituted for by an equal amount by weight of at least one finely powdered colored pigment.

27. The product of claim 26 wherein each boss and parts of the bands have a micro-matte finish on the side opposite the raised bosses.

28. The product of claim 27 wherein on the side opposite the raised bosses there is a thin coating of a mixture of at least one other polymer and at least one finely powdered colored pigment.

29. The product of claim 27 wherein the surface properties of the fabric are modified by corona discharge.

30. The product of claim 28 wherein the surface properties of the fabric are modified by corona discharge.

31. The product of claim 25 wherein from about 10 to about 20% by weight of the high density polyethylene has been substituted for by an equal amount by weight of a color concentrate comprising a 50:50 mixture, by weight, of a finely powdered, colored pigment and low density polyethylene and each boss and parts of the bands have a micro-matte finish on the side opposite the raised bosses.

* * * * *

UNITED STATES PATENT AND TRADEMARK OFFICE
CERTIFICATE OF CORRECTION

PATENT NO. : 4,568,596
DATED : February 4, 1986
INVENTOR(S) : Eric D. Johnson

It is certified that error appears in the above-identified patent and that said Letters Patent are hereby corrected as shown below:

Column 4, Line 61      "5%"

should read     --15%--

Column 7, Line 30      "90°C"

should read     --190°C--

Signed and Sealed this

Twenty-second Day of April 1986

[SEAL]

Attest:

DONALD J. QUIGG

Attesting Officer     Commissioner of Patents and Trademarks